United States Patent [19]

Kolp et al.

[11] 4,023,169
[45] May 10, 1977

[54] AUTOMATIC FREQUENCY CONTROL CIRCUIT FOR FREQUENCY AGILE RADAR

[75] Inventors: Edward J. Kolp, North Canton; Girden W. Harrington, Penisula, both of Ohio

[73] Assignee: Goodyear Aerospace Corporation, Akron, Ohio

[22] Filed: Oct. 17, 1975

[21] Appl. No.: 623,224

[52] U.S. Cl. .......................... 343/17.2 R; 325/418
[51] Int. Cl.[2] ......................................... G01S 7/28
[58] Field of Search .......................... 325/418–423; 343/7 A, 17.2 R

[56] References Cited

UNITED STATES PATENTS 3,707,718  12/1972  Ames ................................. 343/7 A
3,725,935  4/1973  Alpers ................................ 343/7 A Primary Examiner—Richard A. Farley
Assistant Examiner—T. M. Blum
Attorney, Agent, or Firm—Oldham & Oldham

[57] ABSTRACT

An automatic frequency control circuit for frequency agile radar systems. Fundamentally, the invention utilizes two oscillators of different frequencies and which are controlled by the IF pulse envelope. The outputs of the oscillators are monitored until such time that corresponding transition points of the outputs coincide. A counter, receiving the output of one of the oscillators, is then decoded at the time of coincidence and the resulting value, being a function of deviation of the IF pulse from a desired frequency, is applied to the radar system as an error correction signal.

7 Claims, 1 Drawing Figure

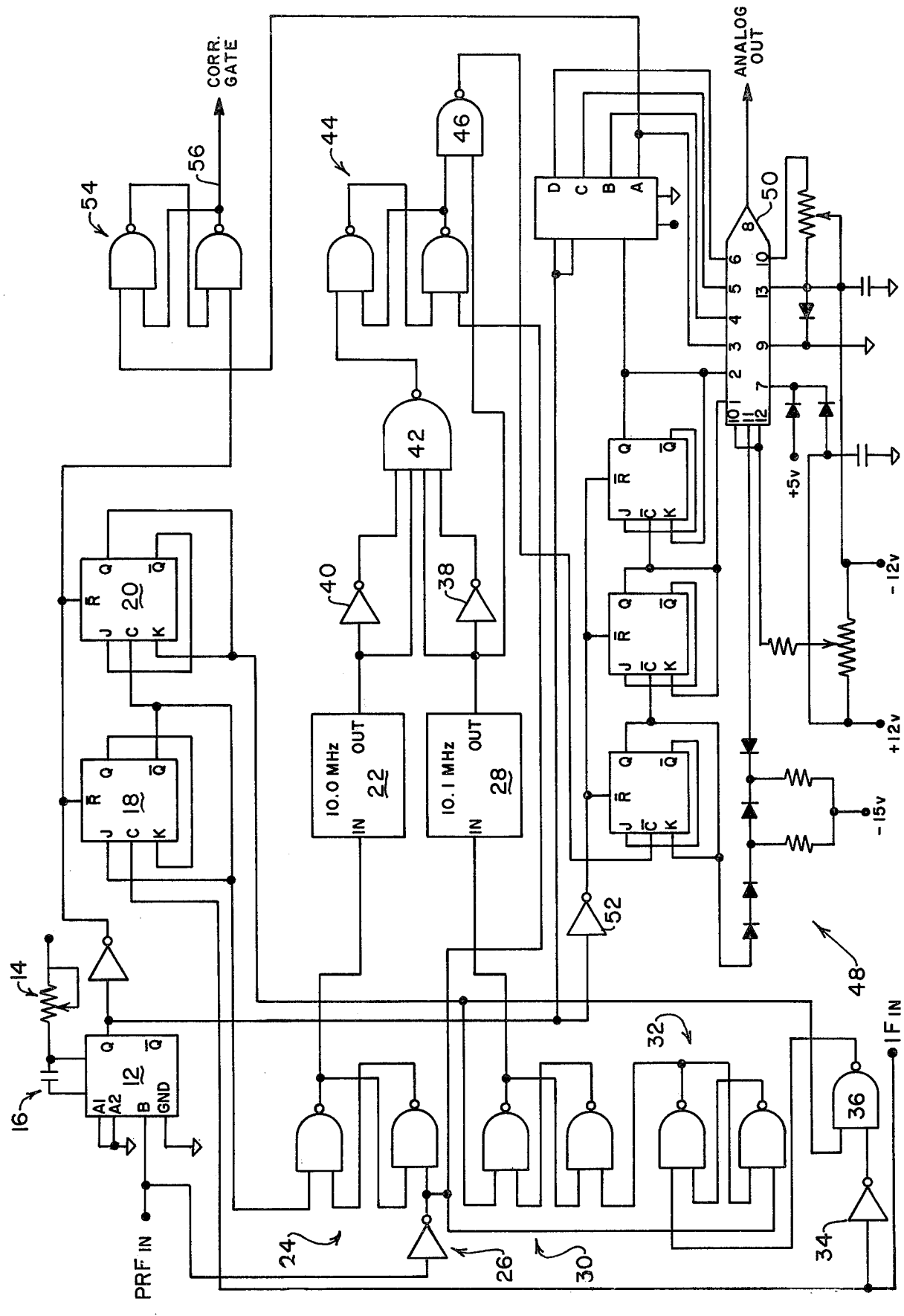

AUTOMATIC FREQUENCY CONTROL CIRCUIT FOR FREQUENCY AGILE RADAR

BACKGROUND OF THE INVENTION

Heretofore it has been known that frequency agile radar systems incorporating agile magnetrons inherently are plagued with the problem of frequency variation of the magnetron output. Therefore, the local oscillator of the system must be capable of tracking the large frequency excursions in order to maintain a constant intermediate frequency (IF). As is well known to those skilled in the art, such frequency variations and the need to compensate therefore are a result of the mechanical tolerances, temperature variations and the like associated with the radar system.

While numerous approaches have been taken in the past to create an automatic frequency control system for incorporation with frequency agile radar, such systems have generally been expensive to construct and of a complex nature while being of an accuracy below that desirable in sensitive systems.

Consequently, it is an object of the instant invention to present an automatic frequency control circuit for a frequency agile radar which is less expensive to construct, more simplictic in nature and of a greater accuracy than those systems heretofore known.

Still another object of the invention is to present an automatic frequency control circuit for a frequency agile radar system which digitizes the frequency output of the magnetron and digitally compares the same against the desired frequency and creates a digital error signal relative to the required frequency adjustment.

These objects and other objects will become apparent as the detailed description proceeds are achieved by: a fine correction automatic frequency control circuit for a frequency agile radar system, comprising: pulse generator means connected to said radar system, receiving an IF envelop therefrom, and producing an output pulse of time duration equivalent to a fixed number of periods of the IF; first and second oscillators of different fixed frequencies connected to and controlled by said pulse generator means; error detection means connected to said oscillators for sensing the phase differentials of the output thereof and creating a correction signal for application to said radar system dependent upon said phase differential.

DESCRIPTION OF THE DRAWING

For a complete understanding of the objects, structure, and techniques of the invention, reference should be had to the following detailed description and accompanying drawing wherein there is shown a schematic diagram of the preferred embodiment of the circuitry of the invention.

DESCRIPTION OF PREFERRED EMBODIMENT

As is known in the art, in a frequency agile radar system, the agile magnetron changes frequency continuously; therefore, the local oscillator must be capable of tracking the large frequency excursions in order to maintain a constant intermediate frequency (IF). A transducer in the agile magnetron generates a voltage coarsely proportional to the instantaneous magnetron frequency. This transducer voltage has a certain associated error. These errors and other system errors necessitate the requirements for circuitry which will accurately track the transmitted pulse frequency and make the necessary correction to the tracking local oscillator (TLO) to set the correct IF before the first video is received.

A system incorporating the teachings of the instant invention is contemplated as including a coarse tracking circuit; the purpose of which is to sample the magnetron tracking voltage during the inter-pulse period and to hold that voltage during the listening time. In such a radar system, a reset pulse preceeds the transmitted pulse by a fixed duration of time. A sample and hold circuit is provided for the magnetron tracking voltage to provide the same during frequency agile operation. During fixed frequency operation, a fixed reference voltage may replace the tracking voltage for purposes of maintaining the proper frequency output from the tracking local oscillator.

Of key importance to the achieving of the objects of the instant invention is the fine correction circuitry presented in the drawing. This circuit, designated generally by the numeral 10, determines the IF frequency during the transmitted pulse and generates a voltage proportional to the error between the desired frequency and the IF frequency during the transmitted pulse. The error voltage is applied to the local oscillator before the first video return is received. Briefly, the theory of operation of the circuitry is to count two periods of the IF and generate a pulse equal in length to that interval. The leading edge of that interval turns on a first oscillator having a fixed output frequency of, for example, 10.0 MHz. The trailing edge of that interval turns on a second oscillator of a fixed output frequency of, for example, 10.1 MHz. It is important that the first and second oscillators differ in a period or frequency by some fixed and known degree. Preferably, and for the values cited, the oscillators will differ in period by one nanosecond. A number of periods of the second oscillator is counted until such time that the positive going edge of the outputs of both oscillators coincide. At that time, the counting is stopped although the oscillators are allowed to continue to run. The number of periods counted is the length in nanoseconds of two periods of the IF. It should be readily appreciated that this count is accurate to within plus or minus 0.5 nanoseconds. The errors at the different frequencies are as follows:

| Frequency (MHz) | Errors (±) |
| --- | --- |
| 20 | .1 MHz |
| 30 | .225 MHz |
| 40 | .4 MHz |
| 50 | .62 MHz |
| 60 | .9 MHz |
| 70 | 1.23 MHz |
| 80 | 1.6 MHz |
| 90 | 2.02 MHz |
| 100 | 2.5 MHz |

In the particular example discussed above using a 30 MHz IF, the acquisition limit is 80 MHz; from 20 to 100 MHz. The lower limit of 20 MHz is established by the radar pulse width. About the lowest frequency that has two periods in the pulse width is 20 MHz. The upper limit of 100 MHz is determined by the band width of the IF amplifier. Another factor governing the 100 MHz selection is the 125 MHz maximum toggle rate of logic packages now available. Of course, as the availability of more rapidly switching logic circuitry increases, these values accordingly change with proper selection of the IF amplifier. It should be readily appreciated that even today applications with IF frequencies up to 350 MHz may be treated according to the teachings of the invention by utilizing the logic family of Motorola Semi-Conductor, Inc. Of Phoenix, Arizona known as MECL III.

Referring now to the drawing, an understanding of the fine correction circuitry comprising the invention may be had. A reset pulse which may be provided in the normal manner as being one of the first pulses in the IF envelope or being created therefrom is applied to a one shot 12 of adjustable time duration via the potentiometer 14 and capacitor 16. The output of the one shot 12 is applied to the reset inputs of the J-K flipflops 18, 20 to hold the same reset during the first few pulses of the IF envelope.

A time period is developed by means of the one shot 12 and the application of the output thereof to the flipflops 18, 20. This time duration is for purposes of utilizing the center of the transmitter pulse envelope for IF content to minimize the effect of magnetron pulling or pushing. When the pulse from the one shot 12 is terminated, the first negative going edge of the IF will turn on a clock 22 via the latch 24. It should be apparent that the latch 24 is enabled by the flipflop 18 and then latched by the next IF pulse received through the inverter 26. While the clock 22 may be of any suitable frequency, it is preferred tht 10.0 MHz oscillator be used. At the end of a two IF period, a second clock 28 is begun via the latch 30. The actuation of the second clock is delayed by the output of the flipflop 20 and the auxiliary latch 32 which receives the IF pulse via the inverter 34 and gate 36; the gate 36 being enabled by the output of the flipflop 20. It should, of course, be appreciated that the beginning of the functioning of the oscillators 22 and 28 is separated by two IF periods by virtue of the enabling of the latch 30 via the second flipflop 20 and the enabling of the gate 36 by means of that same output. It is only upon receipt of an output from the flipflop 20 that the latch 32 is operative to enable the circuit 30. Again, while the clock 28 may be of any suitable nature, it is preferred that the same be of a higher frequency than the clock 22 and, in the preferred embodiment discussed, be a 10.1 MHz oscillator.

It should be briefly noted that the oscillators of the instant invention are unique in that they are gated on and off. When gated on they must come on immediately and also the first period must be equal in length to all subsequent periods. Any physically realizable oscillator will have a finite delay in start-up. The effect of this, however, does not pose a serious problem because both oscillators will have the same delay. Furthermore, the temperature coefficient of these oscillators is not extremely critical because they are both subject to the same environment and are in close proximity; they should then drift by an equal amount. The absolute frequency of these oscillators is not important. The important point is that the difference in the two remains nearly constant.

The outputs of the oscillators 22, 28 are supplied to a coincidence detection circuit comprising inverters 38, 40 and gate 42. This circuit utilizes the propagation delay of the inverters 28, 40 to provide a pulse out of the gate 42 when the oscillators have positive going edges within one nanosecond of each other. A latch 44 which is reset by the same initial pulses actuating the one shot 12 is set by the output of the gate 42. In the reset condition, the latch 44 allows the gate 46 to pass clock pulses from the clock 28 to a seven bit counter 48. The digital output of the counter 48 is applied to the seven bit digital analog converter 50 with the analog output thereof being applied to the local oscillator for correction purposes. It should of course be noted that the counter 48 is reset by means of the output of the one shot 12 via the inverter 52.

A latch 54 which is reset via the one shot 12 is set after a count of eight pulses from the oscillator 28 so as to provide an output signal via 56 which serves to inhibit the application of the correction voltage to a summing amplifier at the local oscillator until a fixed period of time after the transmitted pulse. Consequently, no error is added by the fine correction circuitry discussed.

It should now be readily apparent that the output of the digital to analog converter 50 is proportional to the difference between the desired time interval of two IF periods and the actual period. The output of the D/A converter 50 is of course properly scaled and adjusted such that the error output signal thereof appropriately effects the local oscillator.

Thus it can be seen that the objects of the invention have been satisfied by the structure presented hereinabove. While in accordance with the patent statues only the best mode and preferred embodiment of the invention has been presented and described in detail, it is to be understood that the invention is not limited thereto or thereby. Consequently, for an appreciation of the scope and breadth of the invention, reference should be had to the following claims.

What is claimed is:

1. A fine correction automatic frequency control circuit for frequency agile radar system, comprising:
   pulse generator means connected to said radar system, receiving an IF envelope therefrom, and producing an output pulse of time duration equivalent to a fixed number of periods of the IF;
   first and second oscillators of different fixed frequencies connected to and controlled by said pulse generator means, said first oscillator being of a less frequency than said second oscillator and said first oscillator being actuated by a leading edge of said output pulse while said second oscillator is actuated by a trailing edge thereof; and
   error detection means connected to said oscillators for sensing the phase differentials of the outputs thereof and creating a correction signal for application to said radar system dependent upon said phase differential.

2. The fine correction automatic frequency control circuit as recited in claim 1 wherein said error detection means includes a counter connected to one of said oscillators and a coincidence detector interconnected between said oscillators and said counter to inhibit said counter when transitions of the outputs of the oscillators are coincident.

3. The fine correction automatic frequency control circuit as recited in claim 2 which further includes a digital to analog converter connected to and converting the output of said counter.

4. The fine correction automatic frequency control circuit as recited in claim 1 wherein said pulse generator means includes a timedelayed one shot triggered by the initial pulse in the IF envelope.

5. An automatic frequency control circuit for use in a frequency agile radar system transmitting radar signals within an IF envelope, comprising:
   first oscillator means enabled by an IF pulse and connected to said radar system for producing an output of a first frequency during said IF envelope;
   second oscillator means enabled by an IF pulse subsequent to that enabling said first oscillator means and connected to said radar system for producing an output of a second frequency during said IF envelope; and
   coincidence detection means connected to said first and second oscillator means for receiving the outputs thereof and producing a frequency correction signal dependent upon the time of coincidence of transition points of the output pulses of said first and second oscillator means and wherein said coincidence detection means includes a counter connected to one of said oscillator means and counting output pulses thereof until said time of coincidence of transition points.

6. The automatic frequency control circuit as recited in claim 5 wherein said coincidence detection means includes a digital to analog converter connected to said counter for producing said frequency correction signal as an analog signal.

7. The automatic frequency control circuit as recited in claim 5 which further includes a time-delayed one shot connected to said first and second oscillator means for producing an output signal, the leading edge of which activates said first oscillator means and the trailing edge of which activates said second oscillator means.

* * * * *